(12) United States Patent
Sheppard et al.

(10) Patent No.: US 8,255,904 B2
(45) Date of Patent: Aug. 28, 2012

(54) SYSTEM AND METHOD FOR GENERATING A DISTRIBUTABLE SOFTWARE PACKAGE

(75) Inventors: Robert F. Sheppard, Telford (GB); Stuart De Wavrin, South Bourne (GB); David Gibson, Hampshire (GB); Drew Dubber, Milton Keynes (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1592 days.

(21) Appl. No.: 11/635,906

(22) Filed: Dec. 8, 2006

(65) Prior Publication Data

US 2008/0141243 A1 Jun. 12, 2008

(51) Int. Cl.
*G06F 9/445* (2006.01)
(52) U.S. Cl. ......... 717/177; 717/168; 717/170; 717/172
(58) Field of Classification Search .......... 717/168–178; 709/220–222
See application file for complete search history.

(56) References Cited

U.S. PATENT DOCUMENTS

| | | | |
|---|---|---|---|
| 5,950,010 A * | 9/1999 | Hesse et al. | 717/178 |
| 6,026,438 A | 2/2000 | Piazza et al. | |
| 6,195,794 B1 * | 2/2001 | Buxton | 717/108 |
| 6,202,206 B1 * | 3/2001 | Dean et al. | 717/177 |
| 6,324,690 B1 * | 11/2001 | Luu | 717/177 |
| 6,487,718 B1 * | 11/2002 | Rodriguez et al. | 717/177 |
| 2003/0195995 A1 * | 10/2003 | Tabbara | 709/313 |
| 2005/0125509 A1 | 6/2005 | Ramachandran | |

FOREIGN PATENT DOCUMENTS

WO   WO 03/021430 A2   3/2003

OTHER PUBLICATIONS

Anzböck et al., Software Configuration, Distribution, and Deployment of Web-Services, ACM, 2002, pp. 649-656.*
"Build Manager Tool Architecture and Strategy," Final v1.0, EDS, Mar. 30, 2007, 26 pages.
"eBM Release 1, 2 and 3,", EDS, Aug. 2002, 7 pages.
"eBuild Manager," EDS, Mar. 30, 2007, 36 pages.
"eBuild Manager System Requirements Specification," EDS, Aug. 5, 2005, 55 pages.
Notification of Transmittal of the international Search Report and the Written Opinion of the International Searching Authority, or the Declaration dated Apr. 15, 2008 in PCT Application No. PCT/US2007/084619.

* cited by examiner

*Primary Examiner* — Wei Zhen
*Assistant Examiner* — Satish Rampuria

(57) ABSTRACT

A system, method, and computer program product for generating a distributable software package, including loading a template/profile; loading at least one module; receiving configuration options over a network connection; and assembling a distributable software package according to the profile, template(s), modules, and the configuration options.

21 Claims, 4 Drawing Sheets

SYSTEM AND METHOD FOR GENERATING A DISTRIBUTABLE SOFTWARE PACKAGE

TECHNICAL FIELD OF THE INVENTION

The present disclosure is directed, in general, to software configuration and, more specifically, to customization of software configurations.

BACKGROUND OF THE INVENTION

In any information technology infrastructure deployment, it is necessary to install and customize hardware elements such as data processing system servers and clients, as well as a wide variety of other specialized equipment.

As part of such deployment, it is typically necessary to install operating systems and other software on each data processing system. Generally, the data processing system is customized to the customer or enterprise, so that the specific required operating system, installed applications, and other features will work consistently throughout the enterprise. While some individual data processing systems may have particular requirements, is it often the case that many have an identical custom base build installed on them. For example, all typical employee workstations for an enterprise may require the same basic software installation and common configuration.

Installing and configuring the operating system, applications, and other software elements on each deployed data processing system can be time intensive and expensive. Further, on manual installs, there is a significant possibility of deviations in the configurations of different machines. There is, therefore, a need in the art for an improved system, method, and computer program product for software installation and retention of configurations for future change management.

SUMMARY OF THE INVENTION

Disclosed embodiments provide a system, method, and computer program product for generating a distributable software package, including loading a template; loading at least one module; receiving configuration options over a network connection; and assembling a distributable software package according to the template, module, and the configuration options.

The foregoing has outlined rather broadly the features and technical advantages of the present embodiments so that those skilled in the art may better understand the detailed description that follows. Additional features and advantages of the various embodiments will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION OF THE INVENTION

Figure 1:
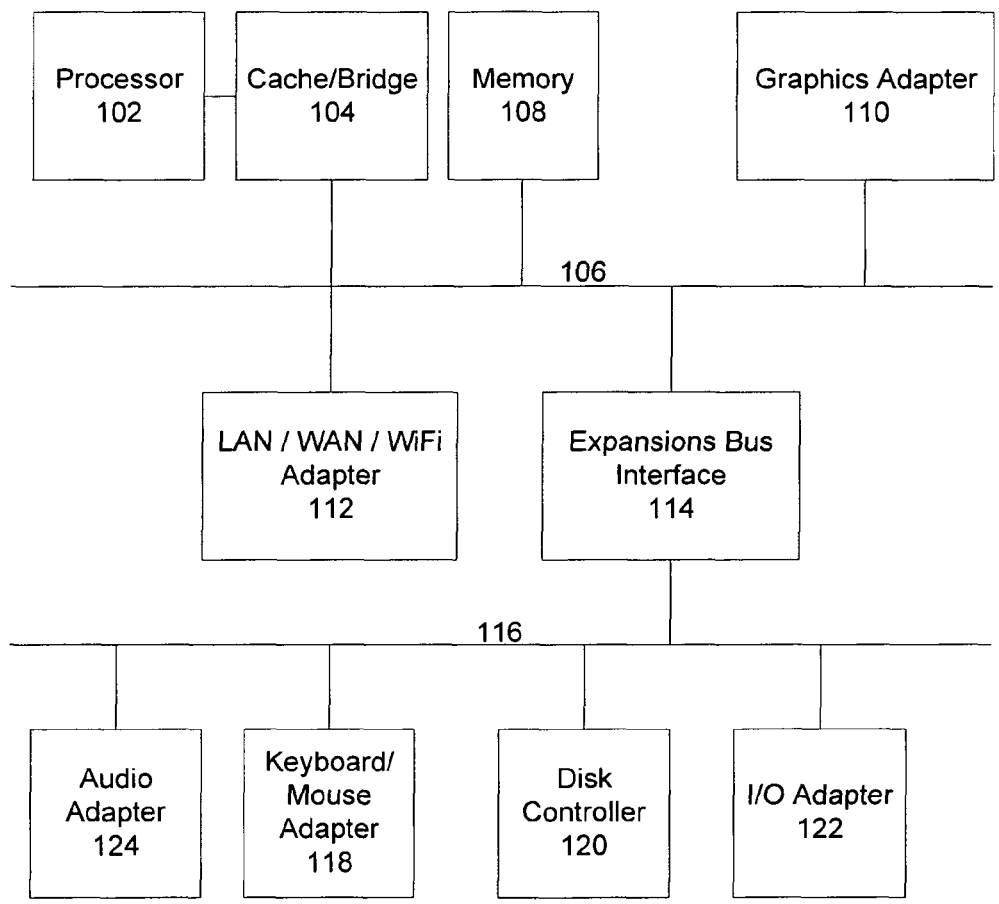
FIG. 1 depicts a block diagram of a data processing system in which a disclosed embodiment can be implemented and illustrates examples of configuration items that may be manipulated using various embodiments.

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with particular reference to the presently preferred embodiment.

Definitions: Following are short definitions of the meanings of some of the technical terms, abbreviations, and acronyms which are used in the present application. (However, those of ordinary skill will recognize whether the context requires a different meaning.) Additional definitions can be found in the standard technical dictionaries and journals. Figure numbers refer to FIG. 3, described below.

eBuild Manager 305: The software computer program product with a user interface used to create, modify and generate eBuild Profiles and assembled builds.

Answer file: The unattended answer file for an Operating System installation in some embodiments, in particular those using MICROSOFT operating system installations. An answer file, as generically used herein, contains all of the unattended attributes that are required to configure an operating system as part of an unattended system build. In some cases, for example, an operating installation will normally require user interaction in response to system prompts. The answer file provides an automatic answer to each of the system prompts.

In certain circumstances the values will need to be changed because a module is employed. Like CustInfo Properties, described below, answer file properties can be assigned a default value from within a module. Should the module be used within a build profile, alternative values can be assigned, providing the Winnt.SIF property is not been marked "Mandatory" from within the module.

Template 310: A template containing the build folder structure and core components (excluding Operating System). A Common Workstation Build (CWB) is a template that is used as the system build for workstations including a customized operating system and associated applications. This is created and maintained with eBuild Manager. A Common Workstation Build is a pre-populated template that requires minimal change in order to create a custom unattended operating system build for a client. The CWB preferably conforms to corporate standards, employs best practices and has already passed systems assurance.

eBuild Profile 330: A collection of template(s) and/or Modules, unattended values and/or CustInfo values and control file(s). An eBuild Profile exists within the eBuild Manager and contains the configuration and settings for a specific operating system build.

Assembled Build 350: The result of the process of Generating a Profile. The Assembled Build includes the files and folders that are used to make the image. The Assembled Build is an output of eBuild Manager in some embodiments.

eBuild Module 340: A collection of one or more Module Components used to complete a function on the target machine on which the build will be installed, such as configure the power save options or install an additional application. A module can comprise of one or more of the following components: Meta Data, Script, Source File(s), Control File (s), answer file elements and Custinfo properties and property/answer file values. A module can contain a small subsection of an answer file or the entire answer file. In some embodiments, all module answer file contents are merged when the build assembly is produced, resulting in the production of just one unattended file.

Module Script: The code used to perform the Module's function. In some embodiments, a script is a single file (binary content) which contains a series of instructions to enable a module as part of an unattended system build. In some implementations, a module may have a maximum of one script file but certain types of modules known as "Driver Modules" may have no script file. A script file is managed from within an individual module and, unlike a control file, it can not be substituted if the related module appears within a profile. The script file itself may optionally contain variables, including the CustInfo properties described herein, which may be exposed by various embodiments as properties. The values assigned to such properties adjust the actions of the script and the results obtained from the scripts execution. Scripts can be created and stored outside of a module. Scripts can be stored independently or as modules or within the module itself.

Control File(s): Used by the Module Script to perform its function. Control Files contain one or more files that affect the module's behavior without changing the Module's Script. One example of a Module Control File is configuration or installation reference files (e.g. Install.ini). Other examples would be customer specific fonts, wallpapers and screen savers. In some embodiments. a control file comprises one or more files and folder (binary content), which will in part replace some of the files found within a module or build assembly. This may include executables and initialization information that alters file content in some manner. A module that appears within a profile that has a module control file may have an alternative control file substituted from within the profile itself, without affecting the module to which it relates.

An individual module outside of a profile can also have a separate control file which is integral to the module itself. Having a separate Module Control File enables changes to the specific module sub component.

Module Source File(s): These are files required by the Module Script to perform its function, for example, if you created a Module to install a piece of software, the source files will be installation source files for that application. A source file may optionally be assigned a destination path which equates to the location where the source files will ultimately reside in the final build assembly.

Meta Data: Meta data is the term given to reference a collection of data excluding any binary content (file(s)), and describes other data content. In this case this can be the name, version, file paths, default property values, and process attributes of modules, profiles, and templates, including Status, Reboot and other templates.

Meta Data Attribute (Reboot): During the unattended install of an operating system, it may be necessary to restart the installation process to enable a module to complete its function. To facilitate this, a module has a "Reboot" flag to indicate if a restart is required. Optionally, this flag maybe altered from within a profile to prevent too many restarts from occurring.

CustInfo Properties: CustInfo Properties are references to the exposed variables found within a module script file. They are used to ultimately modify a module's script behavior without having to change the Modules Script file itself. For example, a Module is used to join a Workstation to a domain. Here, the variable used by the script file could be called "Join_Domain". The CustInfo property name for this Module script file variable will also be "Join_Domain". If the script variable has been assigned a property value like "My Domain", this will become the CustInfo default property value. This is optional as the script file variable may or may not be assigned a value for the "Join_Domain" variable. Each CustInfo property is an external reference to a single variable found within a modules script file. Each variable has a given name, an optional value (known as a Default CustInfo Property Value), a custom value and a description as to the intended use of the variable. A script file may have one or more CustInfo Properties. Both Module and Profile Specific CustInfo property values may be assigned (custom values), from within the module itself or when the module appears within a build profile. Although, it should be noted that any CustInfo Property marked "Mandatory" within a module, can not be assigned an alternative value from within a profile. Change management practices prevail to allow both an auditable trail of change and to track regression to previous values should the need arise.

CustInfo Values: This is the actual value used within a specific eBuild Assembly. To continue the example started in CustInfo properties, the CustInfo Value for Join_Domain may be 'MYDOMAIN.COM' or something else as deemed appropriate to the configuration of the build assembly.

Publishing a Module: The process of flagging a module to be collaborated within eBuild Manager ready for use in eBuild Profiles by others. All modules by default are considered private until published. A private module can only be accessed by the module author. A published module can be accessed by any authorized user.

Run Order: The order that individual modules are launched. Each module has a run number associated with it. During the scripted, unattended, operating system build process, the modules with the lowest run number be applied first. A module can be assigned a default run number so as to form a recommended order when added to a profile. Run numbers may be altered from within a profile, to arrange modules into an exact order. The assignment of a module run number from within a profile will not affect the modules underlying default run number.

FIG. 1 depicts a block diagram of a data processing system in which a disclosed embodiment can be implemented. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular situations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with a embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

Disclosed embodiments provide an automated operating system and workstation build tool that enhances quality, decrease development time and enhances re-use of work globally. Disclosed embodiments provide a managed and consistent approach to the Common Workstation Build (CWB) and future operating system builds, and provide governance to control the use of the tool and components. Disclosed embodiments provide a robust security model to meet global, country and customer requirements, and can define tool infrastructure requirements.

Various embodiments include the ability to upload, store, increment, regress, publish, modify or otherwise collate configuration items (including binary artifacts) in to a distributable library, that may be used to create one or more build assemblies. Such assemblies may be used to compile a software image, for the purpose of delivering a MICROSOFT Unattended, Scripted, Operating System Build, in a manner which is conducive to accountability, version control and other change management practices.

Some embodiments includes a web based solution employing MICROSOFT ASP.NET™ and SQL 2000™. These embodiments enable profiles, modules and scripts to be managed in isolation and facilitates a searchable global catalogue of the same. Users only work with selected catalogue items, limiting the need to have all available content exposed locally. Moreover, a user's work-in-progress is private and inaccessible to others, until it is published or shared by the engineer. Due to export compliance and governance practices, published works need not be distributed until content approval is given. Indeed, classified works or incomplete works, may never be distributed.

Various embodiments enable binary files to be stored within a SQL database for change control, security and ease of distribution.

Inheritance: Various embodiments also enable builds which are derived from a template to be automatically changed when an underlying template is changed. This method of inherited changes enables a new dimension in build engineering. Not only can a Common Workstation Build template be created, but several other configuration specific templates can be derived from one CWB template.

When configuration specific templates are then employed to create a custom build for a client, any change to the Common Workstation Build can be automatically cascaded down in a controlled method, to update the related template. In various embodiments, various templates and the common workstation build are all templates with answer file settings, modules and possibly scripts containing property values and property settings.

The move to place binary files within the SQL database enforces change management practices. It prevents engineers from substituting binary content at will and ensures an auditable log in terms of who did what. Files are managed in a structured and controlled fashion that is conducive to a globally distributed system.

Various embodiments offer a flexible solution and that supports standalone, disconnected, remote and connected modes of operation. This versatility offers scalability and extends choice when engaging in varying situations. Coupled with change management, version control and regression features, various embodiments provide an expert solution for unattended operating system build production.

Figure 2:
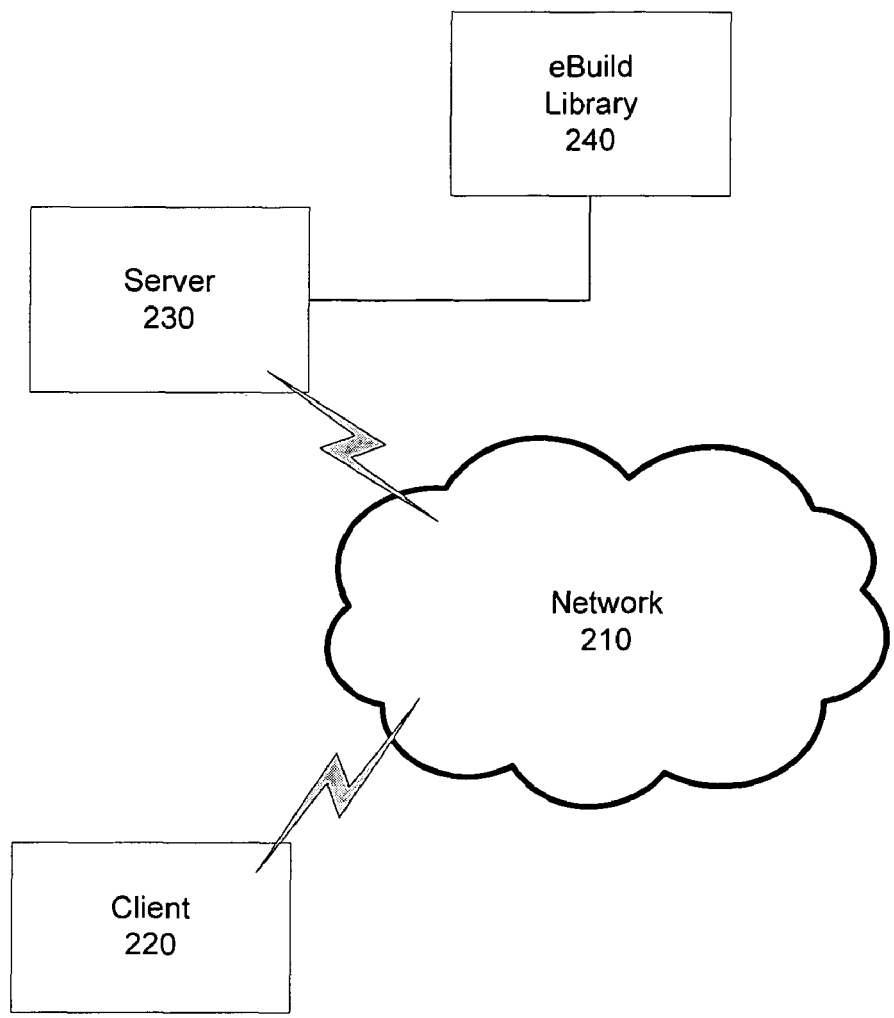
FIG. 2 depicts a block diagram of a data processing system network in accordance with disclosed embodiments.

FIG. 2 depicts a block diagram of a data processing system network in accordance with disclosed embodiments. This figure shows client data processing system 220 and server data processing system 230, each of which can be implemented, for example, using a data processing system as depicted in FIG. 1.

Client data processing system 220 can execute systems and methods as described herein, including executing the eBuild Manager application. In some embodiments, client data processing system 220 can communicate via network 210 with server data processing system 230.

Network 210 can be a public or private network, or combination of them, as known to those skilled in the art, using any known communications protocol. In some embodiments, network 210 includes the Internet.

In some embodiments, server data processing system 230 communicates with software library 240, which includes a data storage that stores various eBuild data components described herein, such as images, eBuild modules and associated files, and other data as described herein. While the library 240 is shown here as a single storage, those of skill in the art will recognize that multiple storage locations can be used to store various library contents.

Figure 3:
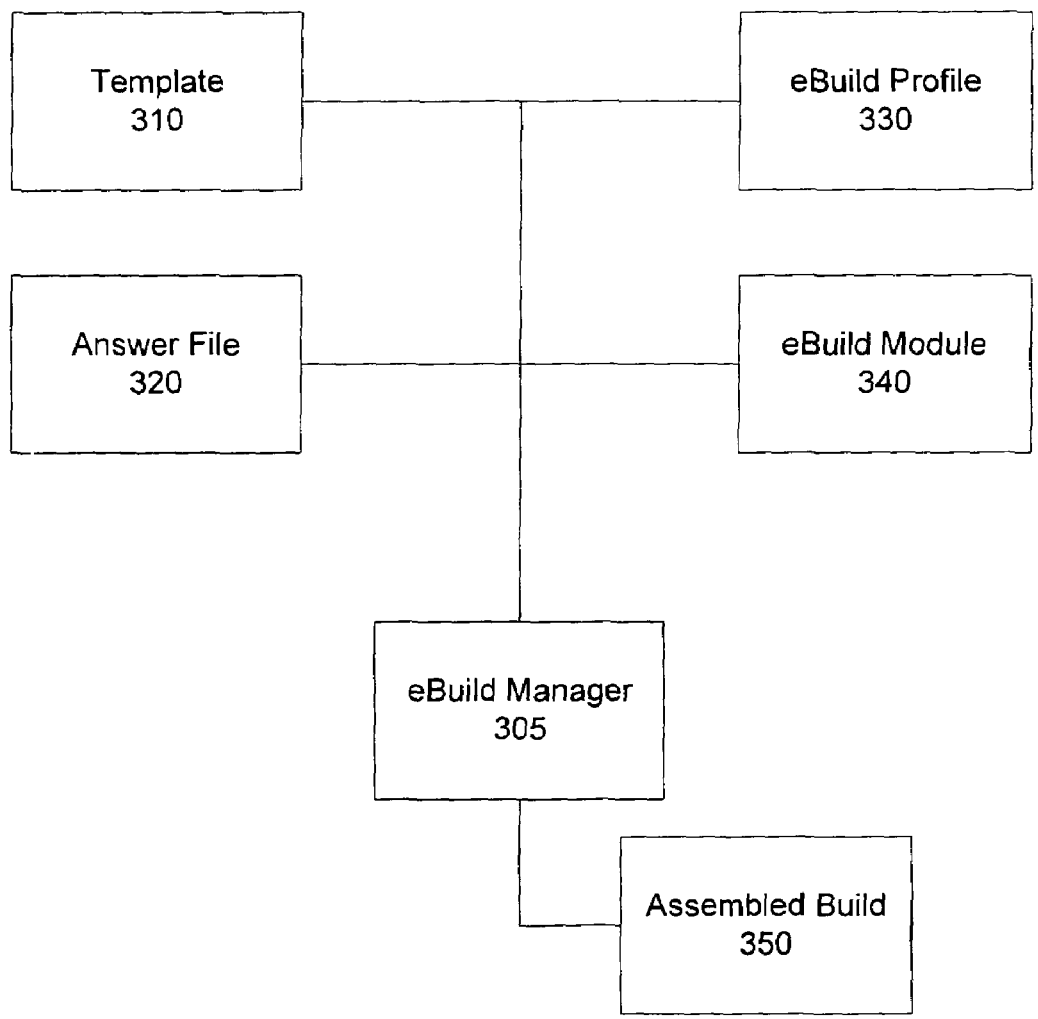
FIG. 3 depicts a block diagram of various software and data elements of a system in accordance with disclosed embodiments.

FIG. 3 depicts a block diagram of various software and data elements of a system in accordance with disclosed embodiments. The system is represented by an eBuild Manager software program product executing on a client or server data processing system to perform a process as described herein. In some embodiments, the eBuild Manager is a "web service" server-based software program product that is accessed and operated by a user using a conventional web browser over a network.

Here, the eBuild Manager 305 can use as input, the templates 310, answer file properties and values 320, CustInfo Properties and values, eBuild profile 330, control files and eBuild Module 340. The eBuild Manager can also interactively accept input from a user. The eBuild profile 330 can include templates, eBuild modules, Scripts, Control Files, Source Files, CustInfo Values, Unattended Properties and values, Run Numbers, Reboot settings, Mandatory Settings, and Names and Descriptions, among other data. In various embodiments, some or all of these input components can be stored in library 240, to be remotely accessed by the eBuild Manager 305 as needed, and to enable sharing of the data with others. In some embodiments, some or all templates and modules are already stored within eBuild Manager for immediate retrieval.

In some embodiments, the answer file 320 is part of the final build assembly 350. The properties which go in part to comprising the answer file are found within a module 340. The property values can be entered from within a module 340 or when the module is used within a profile 330. The collated properties and values of all answer file setting from a profile, will form the answer file within the build assembly.

The eBuild manager can produce the assembled build 350 by using a generate profile method 345. The generate method, collates all binary content with substituted CustInfo and Unattended property values in to a specified folder structure to comprise the build assembly. Assembled build 350, in particular, can be a distributable build in any of many forms known to those of skill in the art, such as stored on a magnetic or optical media, stored for access over a network, and otherwise. The assembled build 350, once compiled into an image, can then be used to automatically install the configured operating system, applications, and other software on a target data processing machine. Any profile can be reused and/or classified as a template profile. A template profile may also be reclassified as a profile.

Figure 4:
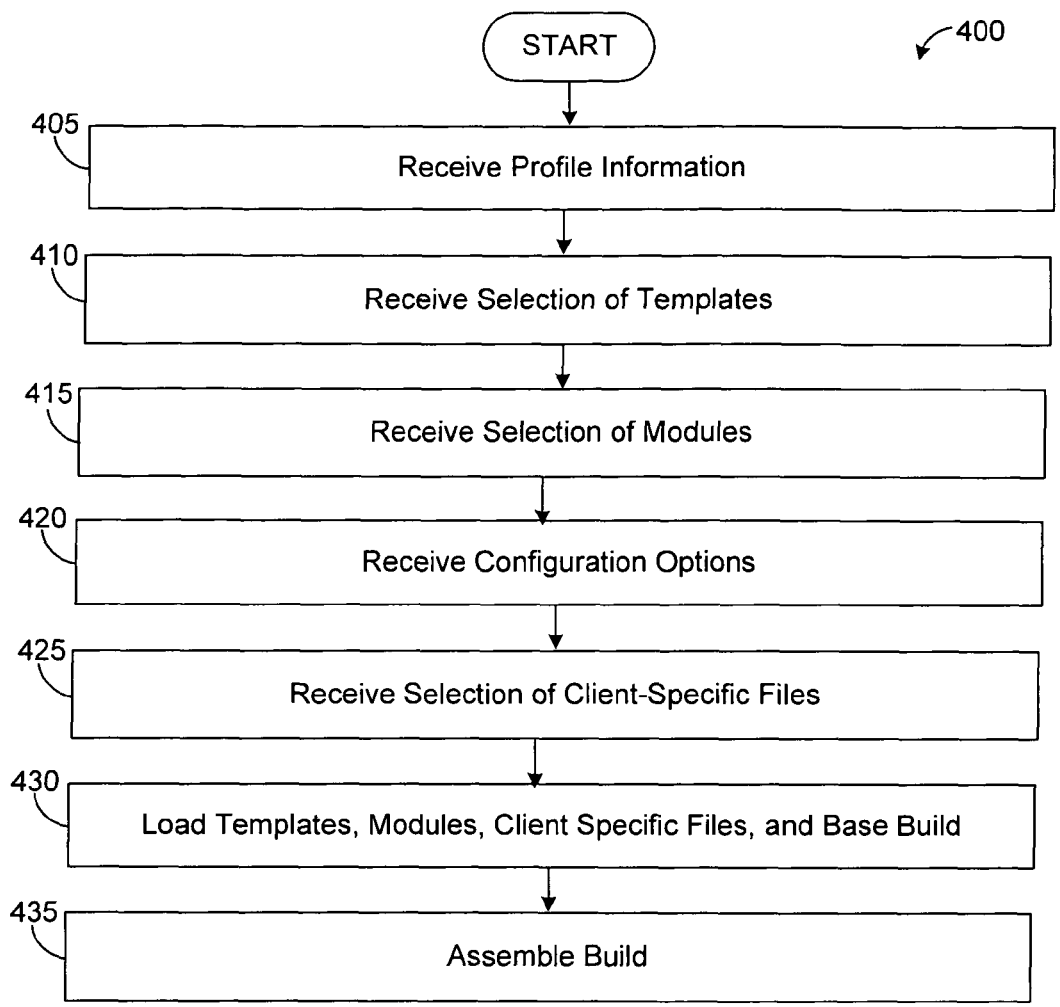
FIG. 4 depicts a flowchart of a process for generating a distributable software package in accordance with various embodiments.

FIG. 4 depicts a flowchart of a process 400 for generating a distributable software package in accordance with various embodiments, as performed by eBuild Manager 305. In some embodiments, the distributable software package is a scripted, unattended operating system build.

First, receive basic profile information to identify the profile (step 405), which can include a client identifier and an identification of the eBuild profile 330 (or other profile) on which the distributable software package will be generated. The eBuild profile (or other selected profile) will include a template. The template or eBuild profile can be a previously-generated template or profile.

Receive a selection of one or more templates (step 410). The templates define the basic structure of the build and additional components. The templates, as well as the modules, client specific files, other builds, and any other information, can be stored in one or more libraries accessible via one or more networks. The system can display the available choices to a user via a web interface.

Receive a selection of at least one module such as eBuild Module 340 (step 415). Each module defines an additional setting, configuration, or application to be included in the build. The system can display the available choices to a user via a web interface.

Receive any configuration options (step 420). Here, the system will interactively define any specific options for the build or the modules within the build. These options are stored in the CustInfo properties, unattended properties/values, reboot settings, run orders and mandatory and other settings, and will be used to create the build assembly. In various embodiments, the system interacts with a user over a web interface, so these configuration options are received over a network connection such as the Internet.

Receive a selection of client-specific files (control files), if any are required (step 425). These can include wall papers, logos, etc. Where a template or module require a selection of client-specific control files, the system can interactively aid the user in selecting the appropriate files. The system can display the available choices to a user via a web interface.

Load all of the selected templates, modules, client-specific files, and any required base builds (step 430). As described above, loading, in this an other loading steps, can include retrieving from a local storage, or retrieving from a library storage 240 over a network. The template can include any necessary information from template 310 and answer file 320 for the base build or other selected components. Note that, as used herein, there is no structural differentiation between base, profile, CWB or other templates other than a name applied to the template. Templates marked "PROFILE TEMPLATE" may be added to other templates. Templates marked "STANDARD PROFILE" may not be added to another template, even though this type of template may be reused, modified copied or otherwise manipulated to derive another build assembly.

Each module includes any necessary Meta Data, Script, Source File(s), Control File(s), answer file and CustInfo properties.

Assemble the build of the distributable software package (step 435). In some embodiments, this is a combined step with the profile generation. The system will assemble the build according to the selected templates, modules, client-specific files, and configuration options. The assembled build 350 is stored. The profile, template, and/or assembled build can then be distributed, published, and otherwise used elsewhere to deploy operating systems and software on target data processing systems. The build assembly does not include target deployment methods. The distributable software package, which can be a single binary file comprising the whole build assembly, is capable of customizing an operating system installation beyond that possible with native configuration methods. All templates, profiles, modules, and their configuration options can be stored as configuration items for distribution.

In some embodiments, during this process, all the specific file versions and attributes associated with such files are collated for simple on-screen modification, preferably via a web browser. With a few "clicks," hundreds of files are collated and organized into a structure, which can be a MICROSOFT-compliant structure, as a build assembly). This is modified automatically to include the changed property/attribute values and makes available the same in an expected format. In some embodiments, the profile's module content and associated binary files are stored in a compressed form. Similarly, in some embodiments, the build assembly is also compressed to aid download speeds across the intranet.

Although FIG. 4 illustrates one example of a method 400 for generating a distributable software package, various changes may be made to FIG. 4. For example, one, some, or all of the steps may occur as many times as needed. Also, while shown as a sequence of steps, various steps in FIG. 4 could occur in parallel or in a different order or dimension, e.g., including inherited changes. As particular examples, some steps shown in FIG. 4 could be performed in parallel, and the loading step 430 can be performed as multiple steps at different times.

Those of skill in the art will recognize that a data processing system as in FIG. 1 includes processing, storage, and communication means for performing each of the steps described above.

In various embodiments, the build is decomposed in to small manageable component parts known as scripts, modules, profiles, templates and are stored in a library.

In various embodiments, full change control and audit of change is enabled for each component part. The production of a build assembly is simplified with the ability to selectively combine component parts from the library.

In various embodiments, scripts which were fit for one time build use now have attributes exposed to enable and simplify re-use. Templates can be compiled to form the framework of a build assembly to expedite build production. Standards can be enforced though management of templates and component parts.

In various embodiments, the build assembly can be compiled by more than one build engineer and by leveraging the work of other engineers. A whole build, in the form of a profile/template, can be stored in a library and reused for another client by simply changing property values and not having to compile and verify the whole build. Production time of the build is reduced to a few hours to a few days. Distribution of configuration items is automated, controlled and secure. Build engineers can work collaboratively anywhere in the world, not just on a client site producing one build for that client.

In various embodiments, any build based on a template can be automatically updated when the underlying template changes. Changes to selected properties and attributes can be denied to secure system assurance.

Those skilled in the art will recognize that, for simplicity and clarity, the full structure and operation of all data processing systems suitable for use with the present disclosure is not being depicted or described herein. Instead, only so much of a data processing system as is unique to the present inventions or necessary for an understanding of the present disclosure is depicted and described. The remainder of the construction and operation of data processing system 100 may conform to any of the various current implementations and practices known in the art.

It is important to note that while the present disclosure has been described in the context of a fully functional system, those skilled in the art will appreciate that at least portions of the mechanism of the present disclosure are capable of being distributed in the form of a instructions contained within a machine usable medium in any of a variety of forms, and that the present disclosure applies equally regardless of the particular type of instruction utilized to actually carry out the distribution. Examples of machine usable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements of the inventions disclosed herein may be made without departing from the spirit and scope of the disclosure in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle.

What is claimed is:

1. A method for generating a distributable software package, comprising:
loading a template from a distributed library of binaries, the distributed library of binaries being available over a network;
loading a number of modules from the distributed library of binaries;
receiving configuration options over the network, the configurations options defining options for the distributable software package and the modules within the distributable software package; and
assembling a distributable software package according to the template, module, and the configuration options,
if the distributable software package is derived from a template version of the distributable software package, and the template version of the distributable software package is modified, then modifying the distributable software package when the template version of the distributable software package is modified,
in which the distributed library of binaries comprises template versions of binaries and modified versions of the template versions of the binaries.

2. The method of claim 1, wherein the distributable software package customizes an operating system installation in a manner different from a native configuration method.

3. The method of claim 1, wherein the module includes at least one of meta data, a script, a source file, a control file, and an answer file.

4. The method of claim 1, in which the modules comprise a plurality of configuration options.

5. The method of claim 1, further comprising receiving, over a network connection, a selection of the template and the module.

6. The method of claim 1, further comprising storing the template, module, and the configuration options in modular form for distribution.

7. The method of claim 1, further comprising installing the distributable software package on a target data processing system.

8. A data processing system comprising:
a memory, and a processor communicatively coupled to the memory, the processor to:
load an eBuild profile;
load a template from a distributed library of binaries, the distributed library of binaries being available over a network;
load a number of modules from the distributed library of binaries;
receive configuration options over the network, the configurations options defining options for the distributable software package and the modules within the distributable software package;
assemble a distributable software package according to the profile, template, module, and the configuration options; and store the profile, template, module, and configuration options in modular form for distribution, if the distributable software package is derived from a template version of the distributable software package, and the template version of the distributable software package is modified, then modifying the distributable software package when the template version of the distributable software package is modified, in which the distributed library of binaries comprises template versions of binaries and modified versions of the template versions of the binaries.

9. The data processing system of claim 8, wherein the distributable software package customizes an operating system installation in a manner different from a native configuration method.

10. The data processing system of claim 8 wherein the module includes at least one of meta data, a script, a source file, a control file, and an answer file.

11. The data processing system of claim 8, wherein the module includes a plurality of configuration options.

12. The data processing system of claim 8, in which the processor is further to receive, over the network, a selection of the template and the module.

13. The data processing system of claim 8, in which the processor is further to install the distributable software package on a target data processing system.

14. The data processing system of claim 8, in which the distributed library of binaries is available to a client other than the client that authored the binary.

15. A computer program product embodied in a non-transitory machine-readable medium for generating a distributable software package, comprising:

computer usable program code to, when executed by a processor, load a template from a distributed library of binaries, the distributed library of binaries being available over a network;

computer usable program code to, when executed by a processor, load a number of modules from the distributed library of binaries;

computer usable program code to, when executed by a processor, receive configuration options over the network;

computer usable program code to, when executed by a processor, assemble a distributable software package according to the template, module, and the configuration options; and computer usable program code to, when executed by a processor, if the distributable software package is derived from a template version of the distributable software package, and the template version of the distributable software package is modified, then modify the distributable software package when the template version of the distributable software package is modified, in which the distributed library of binaries comprises template versions of binaries and modified versions of the template versions of the binaries.

16. The computer program product of claim 15, wherein the distributable software package customizes an operating system installation in a manner different from a native configuration method.

17. The computer program product of claim 15, wherein the module includes at least one of meta data, a script, a source file, a control file, and an answer file.

18. The computer program product of claim 15, in which the modules comprise a plurality of configuration options.

19. The computer program product of claim 15, further comprising computer usable program code to, when executed by a processor, receive, over the network connection, a selection of the template and the module.

20. The computer program product of claim 15, further comprising computer usable program code to, when executed by a processor, store the template, module, and the configuration options in modular form for distribution.

21. The computer program product of claim 15, further comprising computer usable program code to, when executed by a processor, install the distributable software package on a target data processing system.

* * * * *

UNITED STATES PATENT AND TRADEMARK OFFICE
CERTIFICATE OF CORRECTION

| | | |
|---|---|---|
| PATENT NO. | : 8,255,904 B2 | Page 1 of 1 |
| APPLICATION NO. | : 11/635906 | |
| DATED | : August 28, 2012 | |
| INVENTOR(S) | : Robert F. Sheppard et al. | |

It is certified that error appears in the above-identified patent and that said Letters Patent is hereby corrected as shown below:

In column 11, line 17, in Claim 10, delete "claim 8" and insert -- claim 8, --, therefor.

Signed and Sealed this
Twelfth Day of February, 2013

Teresa Stanek Rea
*Acting Director of the United States Patent and Trademark Office*